(12) United States Patent
Chen

(10) Patent No.: US 12,482,383 B2
(45) Date of Patent: Nov. 25, 2025

(54) SENSING CIRCUIT WITHIN A DISPLAY AND DETECTION METHOD OF SENSING SIGNAL

(71) Applicant: Shenzhen China Star Optoelectronics Semiconductor Display Technology Co., Ltd., Shenzhen (CN)

(72) Inventor: Zhiyi Chen, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 5 days.

(21) Appl. No.: 17/618,509

(22) PCT Filed: Nov. 5, 2021

(86) PCT No.: PCT/CN2021/128954
§ 371 (c)(1),
(2) Date: May 4, 2023

(87) PCT Pub. No.: WO2023/070730
PCT Pub. Date: May 4, 2023

(65) Prior Publication Data
US 2024/0038109 A1   Feb. 1, 2024

(30) Foreign Application Priority Data
Oct. 28, 2021   (CN) .......................... 202111264701.2

(51) Int. Cl.
*G09G 3/00*   (2006.01)
*G06F 3/042*   (2006.01)

(52) U.S. Cl.
CPC ............. *G09G 3/006* (2013.01); *G06F 3/042* (2013.01)

(58) Field of Classification Search
None
See application file for complete search history.

(56) References Cited

U.S. PATENT DOCUMENTS

2006/0007071 A1   1/2006   Yamazaki et al.
2012/0262384 A1   10/2012   Kim et al.
(Continued)

FOREIGN PATENT DOCUMENTS

CN   107861278 A         3/2018
CN   110310609 A   *   10/2019   ........... G09G 3/3614
(Continued)

OTHER PUBLICATIONS

International Search Report in International application No. PCT/CN2021/128954, mailed on May 25, 2022.
(Continued)

*Primary Examiner* — Benjamin C Lee
*Assistant Examiner* — Nathan P Brittingham
(74) *Attorney, Agent, or Firm* — Nathan & Associates Patent Agents Ltd.; Menachem Nathan

(57) ABSTRACT

A sensing circuit and a detection method of a sensing signal are provided. The detection method of the sensing signal includes in a display cycle of a first frame, reading a signal of a display panel to obtain a first sensing signal; in a display cycle of a second frame, reading the signal of the display panel to obtain a second sensing signal, wherein a polarity of a display voltage corresponding to the display cycle of the second frame and a polarity of a display voltage corresponding to the display cycle of the first frame are opposite to each other; and producing a target sensing signal according to the first sensing signal and the second sensing signal.

9 Claims, 5 Drawing Sheets

(56) References Cited

U.S. PATENT DOCUMENTS

| | | | |
|---|---|---|---|
| 2013/0027326 A1 | 1/2013 | Kim et al. | |
| 2013/0063400 A1 | 3/2013 | Ahn et al. | |
| 2013/0093720 A1 | 4/2013 | Liu et al. | |
| 2015/0256760 A1* | 9/2015 | Ju | H04N 23/76 348/256 |
| 2017/0090641 A1 | 3/2017 | Khazeni et al. | |
| 2017/0092190 A1* | 3/2017 | Choe | G09G 3/2003 |
| 2018/0164950 A1 | 6/2018 | Kang et al. | |
| 2018/0167567 A1 | 6/2018 | Malinge et al. | |
| 2021/0174737 A1 | 6/2021 | Park et al. | |

FOREIGN PATENT DOCUMENTS

| | | | | |
|---|---|---|---|---|
| CN | 112599064 A | * | 4/2021 | G09G 3/20 |
| CN | 112748593 A | | 5/2021 | |
| EP | 3608899 A1 | | 2/2020 | |
| KR | 20180028565 A | * | 3/2018 | G01R 15/002 |
| TW | 584244 B | | 5/2017 | |

OTHER PUBLICATIONS

Written Opinion of the International Search Authority in International application No. PCT/CN2021/128954, mailed on May 25, 2022.

Chinese Office Action issued in corresponding Chinese Patent Application No. 202111264701.2 dated Nov. 30, 2022, pp. 1-12.

\* cited by examiner

SENSING CIRCUIT WITHIN A DISPLAY AND DETECTION METHOD OF SENSING SIGNAL

FIELD OF INVENTION

The present application relates to the field of display technology, and specifically to a sensing circuit and a detection method of a sensing signal.

BACKGROUND OF INVENTION

With development of science and technology, display panels integrated with light sensing functions are widely applied to aspects of life, work, and learning, bringing more various and convenient user experience to users. Currently, light sensing functions of display panels are generally realized through on glass technology. In comparison with on glass technology, in-cell photo sensors are more advantageous in terms of cost and mass production.

SUMMARY OF INVENTION

However, in technology of in-cell photo sensors, because circuits of light sensing components, devices for displaying, and signal wiring are disposed in one mask, parasitic capacitance occurred between the signal wiring such as data lines produces crosstalk with feedback sensing signals of the light sensing components, affecting detection accuracy of the sensing signals.

The present application provides a sensing circuit and a detection method of a sensing signal to solve a technical problem that, during a course of detecting a sensing signal, signal wiring such as data lines produces crosstalk that affects detection accuracy of the sensing signals.

The present application provides a detection method of a sensing signal that includes following steps:

In a display cycle of a first frame, reading a signal of a display panel to obtain a first sensing signal; in a display cycle of a second frame, reading the signal of the display panel to obtain a second sensing signal, wherein a polarity of a display voltage corresponding to the display cycle of the second frame and a polarity of a display voltage corresponding to the display cycle of the first frame are opposite to each other; and producing a target sensing signal according to the first sensing signal and the second sensing signal.

Optionally, in some embodiments of the present application, the step of in the display cycle of the first frame, reading the signal of the display panel to obtain the first sensing signal includes following steps: reading the signal of the display panel for a first time to obtain a first sub-sensing signal, wherein the first sub-sensing signal includes a first noise signal; reading the signal of the display panel for a second time to obtain a second sub-sensing signal, wherein the second sub-sensing signal includes the first noise signal and a first photocurrent; and producing the first sensing signal according to the first sub-sensing signal and the second sub-sensing signal.

Optionally, in some embodiments of the present application, the step of reading the signal of the display panel for the first time and the step of reading the signal of the display panel for the second time have at least one row of pixel scan time therebetween.

Optionally, in some embodiments of the present application, the step of producing the first sensing signal according to the first sub-sensing signal and the second sub-sensing signal includes following steps: obtaining a difference between the first sub-sensing signal and the second sub-sensing signal to obtain the first sensing signal.

Optionally, in some embodiments of the present application, the step of in the display cycle of the second frame, reading the signal of the display panel to obtain the second sensing signal includes following steps: reading the signal of the display panel for a first time to obtain a third sub-sensing signal, wherein the third sub-sensing signal includes a second noise signal; reading the signal of the display panel for a second time to obtain a fourth sub-sensing signal, wherein the fourth sub-sensing signal includes the second noise signal and a second photocurrent; and producing the second sensing signal according to the third sub-sensing signal and the fourth sub-sensing signal.

Optionally, in some embodiments of the present application, the step of reading the signal of the display panel for the first time and the step of reading the signal of the display panel for the second time have at least one row of pixel scan time therebetween.

Optionally, in some embodiments of the present application, the step of producing the second sensing signal according to the third sub-sensing signal and the fourth sub-sensing signal includes following steps: obtaining a difference between the third sub-sensing signal and the fourth sub-sensing signal to obtain the second sensing signal.

Optionally, in some embodiments of the present application, the step of producing the target sensing signal according to the first sensing signal and the second sensing signal includes following steps: obtaining a mean value of the first sensing signal and the second sensing signal to obtain the target sensing signal.

Optionally, in some embodiments of the present application, the display cycle of the first frame and the display cycle of the second frame are adjacent display cycles.

The present application further provides a detection method of a sensing signal that includes following steps: in a display cycle of a first frame, reading a signal of a display panel for a first time to obtain a first sub-sensing signal, wherein the first sub-sensing signal includes a first noise signal; reading the signal of the display panel for a second time to obtain a second sub-sensing signal, wherein the second sub-sensing signal includes the first noise signal and a first photocurrent; producing a first sensing signal according to the first sub-sensing signal and the second sub-sensing signal; in a display cycle of a second frame, reading the signal of the display panel for a first time to obtain a third sub-sensing signal, wherein the third sub-sensing signal includes a second noise signal; reading the signal of the display panel for a second time to obtain a fourth sub-sensing signal, wherein the fourth sub-sensing signal includes the second noise signal and a second photocurrent; producing a second sensing signal according to the third sub-sensing signal and the fourth sub-sensing signal; and producing a target sensing signal according to the first sensing signal and the second sensing signal.

Optionally, in some embodiments of the present application, the step of reading the signal of the display panel for the first time and the step of reading the signal of the display panel for the second time have at least one row of pixel scan time therebetween.

Optionally, in some embodiments of the present application, the step of producing the first sensing signal according to the first sub-sensing signal and the second sub-sensing signal includes following steps: obtaining a difference between the first sub-sensing signal and the second sub-sensing signal to obtain the first sensing signal.

Optionally, in some embodiments of the present application, the step of producing the target sensing signal according to the first sensing signal and the second sensing signal includes following steps: obtaining a mean value of the first sensing signal and the second sensing signal to obtain the target sensing signal.

Optionally, in some embodiments of the present application, the display cycle of the first frame and the display cycle of the second frame are adjacent display cycles.

Correspondingly, the present application further provides a sensing circuit that includes a light sensing module and a detection module; wherein a signal reading line is electrically connected to the light sensing module and the detection module, and through the light sensing module, the detection module is configured to in a display cycle of a first frame, read a signal of a display panel to obtain a first sensing signal; in a display cycle of a second frame, read the signal of the display panel to obtain a second sensing signal, wherein a polarity of a display voltage corresponding to the display cycle of the second frame and a polarity of a display voltage corresponding to the display cycle of the first frame are opposite to each other; and produce a target sensing signal according to the first sensing signal and the second sensing signal.

Optionally, in some embodiments of the present application, the light sensing module includes a light sensing transistor, a switch transistor, and a sensing capacitor; wherein a gate of the light sensing transistor is input by a first power voltage, a source of the light sensing transistor is input by a second power voltage, a drain of the light sensing transistor, one terminal of the sensing capacitor, and a source of the switch transistor are connected, a gate of the switch transistor is input by a scan signal, and a drain of the switch transistor is electrically connected to the signal reading line; and wherein when reading the signal of the display panel for a first time, the light sensing transistor and the switch transistor are turned off, and when reading the signal of the display panel for a second time, the light sensing transistor is turned off and the switch transistor is turned on.

Optionally, in some embodiments of the present application, the detection module includes a sampling unit and a processing unit; wherein the detection module is configured to obtain the first sensing signal and the second sensing signal through the signal reading line; wherein the processing unit is connected to an analog-to-digital converter and configured to process the first sensing signal and the second sensing signal to produce the target sensing signal.

Optionally, in some embodiments of the present application, the processing unit is a field-programmable gate array (FPGA).

Optionally, in some embodiments of the present application, the sampling unit includes an amplifier, an integrator capacitor, a switch device, a correlated double sampling (CDS) circuit, and an analog-to-digital converter (ADC); wherein a first input terminal of the amplifier is input by a reference voltage, a second input terminal of the amplifier is electrically connected to the signal reading line, an output terminal of the amplifier is connected to the CDS circuit, and the CDS circuit is connected to the ADC.

Optionally, in some embodiments of the present application, the sensing circuit includes a driving chip, wherein the processing unit outputs the target sensing signal to the driving chip.

The present application provides a sensing circuit and a detection method of a sensing signal. The detection method of the sensing signal includes in a display cycle of a first frame, reading a signal of a display panel to obtain a first sensing signal; in a display cycle of a second frame, reading the signal of the display panel to obtain a second sensing signal, wherein a polarity of a display voltage corresponding to the display cycle of the second frame and a polarity of a display voltage corresponding to the display cycle of the first frame are opposite to each other; and producing a target sensing signal according to the first sensing signal and the second sensing signal. In the present application, the target sensing signal is produced through the first sensing signal and the second signal from two times of detections, and because the polarity of the display voltage corresponding to the display cycle of the first frame and the polarity of the display voltage corresponding to the display cycle of the second frame are opposite to each other, crosstalk of sensing signals due to alternatively varying display voltage among each display cycle can be mitigated, increasing detection accuracy of the sensing signals.

DESCRIPTION OF DRAWINGS

The accompanying figures to be used in the description of embodiments of the present application will be described in brief to more clearly illustrate the technical solutions of the embodiments. The accompanying figures described below are only part of the embodiments of the present application, from which figures those skilled in the art can derive further figures without making any inventive efforts.

DETAILED DESCRIPTION OF PREFERRED EMBODIMENTS

Figure 1:
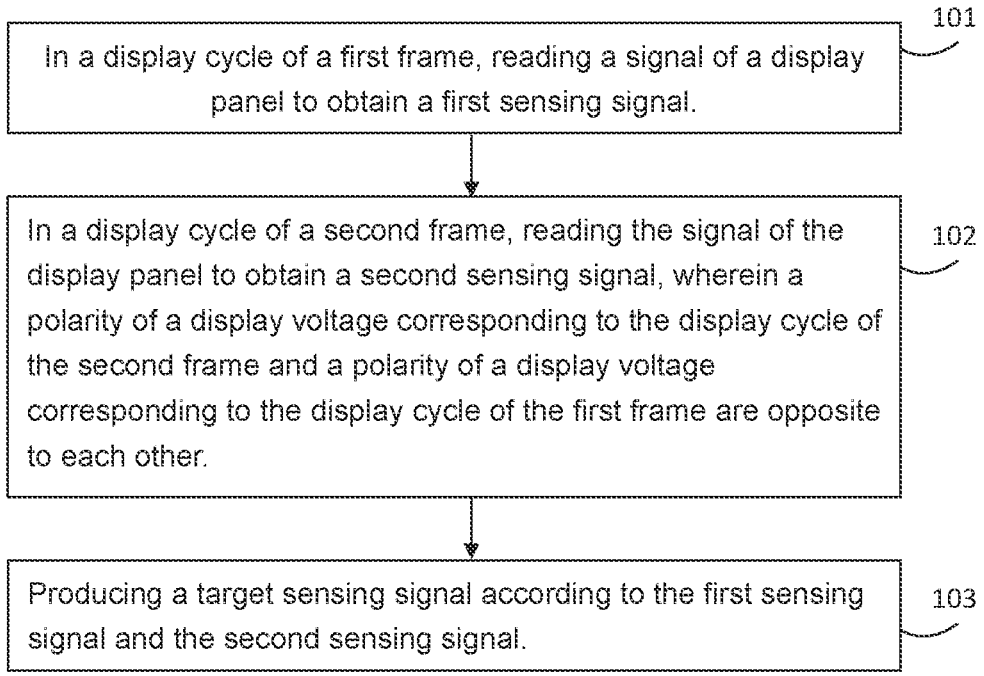
FIG. 1 is a flowchart of a detection method of a sensing signal according to the present application.

For better clearness and definiteness of purpose, technical approach, and effect of the present application, the following further describes embodiments of the present application in detail with reference to accompanying drawings. It should be understood that the embodiments described here is merely for explaining the present application and not intended to limit the present application.

In description of the present application, it should be understood that terms "first" and "second" are used simply for purpose of description and cannot be understood to mean or suggest relative importance or implicitly mean amount of the technical features. Therefore, features with terms "first" and "second" can mean or implicitly include one or more of the features and should not be understood as limitation of the present application.

The present application provides a sensing circuit and a detection method of a sensing signal, and the following describes them in detail. It should be explained that description order of the following embodiments does not limit order of favorableness of the embodiments.

In the detection method of the sensing signal according to the present application, first, in a display cycle of a first frame, reading signals of a display panel to obtain a first sensing signal. Second, in a display cycle of a second frame, reading the signals of the display panel to obtain a second sensing signal. Wherein, a polarity of a display voltage corresponding to the display cycle of the second frame and a polarity of a display voltage corresponding to the display cycle of the first frame are opposite to each other. At last, producing a target sensing signal according to the first sensing signal and the second sensing signal.

It can be understood that the display panel is a liquid crystal display panel. Because liquid crystal molecules driven under a DC voltage would be polarized and result in a residual image, positive and negative voltages are alternatively adopted for pixel driving signals to drive liquid crystal molecules. When detecting a sensing signal of the display panel through a signal reading line, if the signal reading line is adjacent to a data line, because display voltage of the data line alternatively varies, a charge quantity of the signal reading line is affected by crosstalk coupling caused by parasitic capacitance occurred between the signal reading line and the data line, affecting detection accuracy of the sensing signal.

Regarding this, in the present application, through setting display voltage polarities corresponding to the display cycle of the first frame and the display cycle of the second frame opposite, and separately reading signals of the display panel during the display cycle of the first frame and the display cycle of the second frame, obtaining the first sensing signal and the second sensing signal. Therefore, generally, if a detection result of the first sensing signal is smaller due to crosstalk, then a detection result of the second sensing signal would be greater due to crosstalk, and vice versa. Therefore, using the separately obtained first sensing signal and second sensing signal to produce the target sensing signal, crosstalk of sensing signals due to alternatively varying display voltage among each display cycle can be mitigated, increasing detection accuracy of the sensing signals.

It should be explained that a driving structure of frame reversing, row reversing, or combined of the two can be adopted for the display panel of the present application, as long as opposite display voltage polarities corresponding to the display cycle of the first frame and the display cycle of the second frame are ensured. Wherein, under the driving structure of frame reversing, display voltage polarities corresponding to adjacent display cycles are opposite. Under the driving structure of row reversing, display voltage polarities corresponding to each row of sub-pixels in each display cycle are opposite.

In the present application, because display voltage polarities corresponding to each display cycle of a static display are different, while voltage values are unchanged, the detection method of the sensing signal according to the present application has a significant improvement for a static picture. However, in a dynamic display, because varying display voltage polarities also produce partial crosstalk, the detection method of the sensing signal according to the present application has a certain improvement for a dynamic picture.

In the present application, through detecting the sensing signal of the display panel, the obtained first sensing signal and second sensing signal can be a photocurrent of a light sensing component, a signal of a pixel driving circuit to be compensated, other signals of the display panel needed to be tested, etc., which are not limited here.

In following embodiments of the present application, the first sensing signal and the second sensing signal as a photocurrent of a light sensing component are illustrated in detail, but they are not intended to limit the present application.

Referring to FIG. 1, FIG. 1 is a flowchart of the detection method of the sensing signal according to the present application. In the present application, the detection method of the sensing signal specifically includes following steps:

101, in a display cycle of a first frame, reading a signal of a display panel to obtain a first sensing signal.

Specifically, a light sensing unit and a signal reading line can be disposed in the display panel. In the display cycle of the first frame, reading a photocurrent produced by the light sensing unit through the signal reading line to obtain the first sensing signal.

In some embodiments, through directly reading, the first sensing signal is directly read and obtained to increase detection efficiency.

Figure 2:
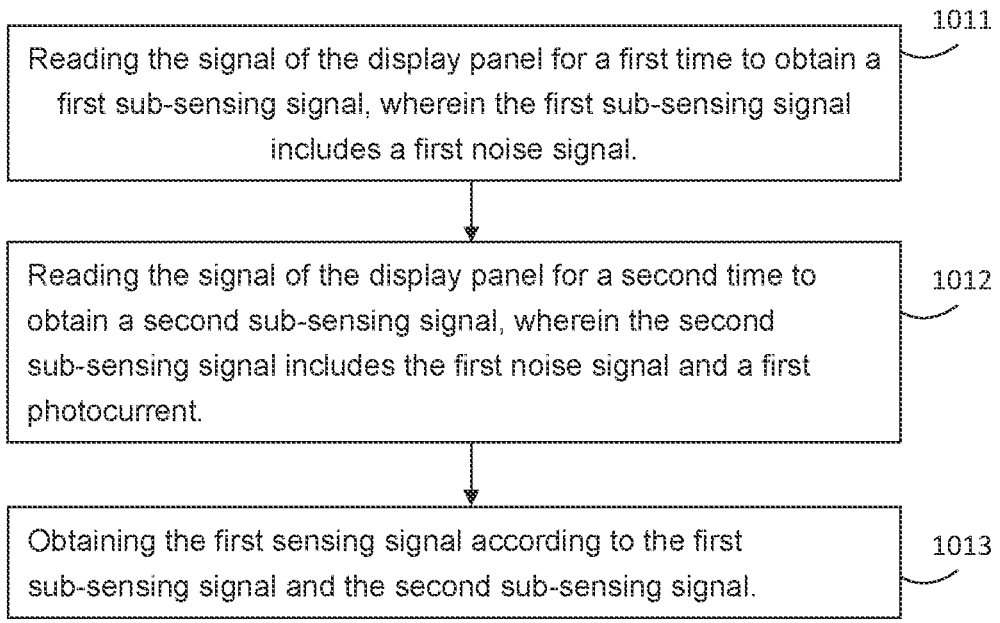
FIG. 2 is a flowchart of step 101 of FIG. 1.

In other embodiments, the first sensing signal is obtained through indirectly reading to further increase detection accuracy. Specifically, referring to FIG. 2, FIG. 2 is a flowchart of step 101 of FIG. 1. Step 101 includes followings steps:

1011, reading the signal of the display panel for a first time to obtain a first sub-sensing signal, wherein the first sub-sensing signal includes a first noise signal.

Specifically, because environmental interferences, manufacturing deviations, etc., different light sensing units in the display panel have different noise interference and produce different leakage currents. The first sub-sensing signal is read through the signal reading line 13 to obtain the first noise signal and a first leakage current signal. Wherein, through turning off the light sensing units, the signal of the display panel can be directly read for the first time to make the obtained first sub-sensing signal not include a photocurrent to be detected.

1012, reading the signal of the display panel for a second time to obtain a second sub-sensing signal, wherein the second sub-sensing signal includes the first noise signal and a first photocurrent.

Specifically, after the display panel sensing light, reading the signal of the display panel for the second time to obtain the second sub-sensing signal. At this time, the display panel is irradiated by laser or other sources, and the light sensing units produce a photo current. Meanwhile, because factors such as environmental interferences, manufacturing deviations, etc., the second sensing signal includes the first noise signal, the first leakage current signal, and the first photocurrent. Wherein, through turning on the light sensing units, the signal of the display panel can be read for the second time to make the obtained second sub-sensing signal include the first photocurrent to be detected.

1013, obtaining the first sensing signal according to the first sub-sensing signal and the second sub-sensing signal.

Specifically, from step 1011 and step 1012, through obtaining a difference between the first sub-sensing signal and the second sub-sensing signal, the obtained first sensing signal is the first photocurrent produced after the display panel being irradiated by laser, eliminating the first noise signal and the first leakage current signal, thereby increasing a signal-to-noise ratio.

102, in a display cycle of a second frame, reading the signal of the display panel to obtain a second sensing signal, wherein a polarity of a display voltage corresponding to the display cycle of the second frame and a polarity of a display voltage corresponding to the display cycle of the first frame are opposite to each other.

Specifically, the light sensing unit and the signal reading line can be disposed in the display panel. In the display cycle of the second frame, reading a photocurrent produced by the light sensing unit through the signal reading line to obtain the second sensing signal.

In some embodiments, through directly reading, the second sensing signal is directly read and obtained to increase signal reading efficiency.

Figure 3:
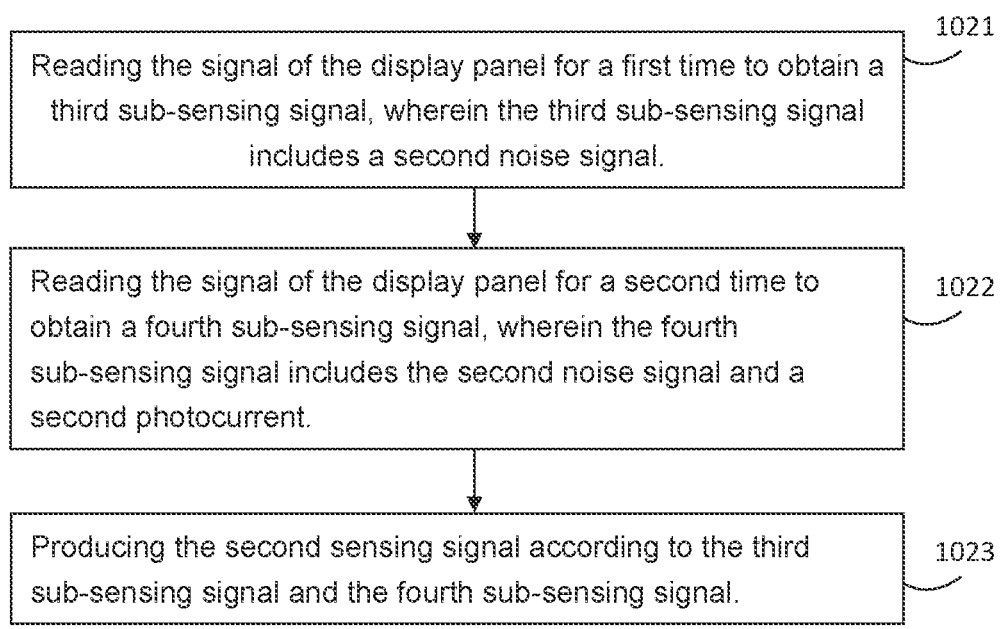
FIG. 3 is a flowchart of step 102 of FIG. 1.

In other embodiments, the second sensing signal is obtained through indirectly reading to further increase detection accuracy. Referring to FIG. 3, FIG. 3 is a flowchart of step 102 of FIG. 1. Step 102 includes following steps:

1021, reading the signal of the display panel for a first time to obtain a third sub-sensing signal, wherein the third sub-sensing signal includes a second noise signal.

Specifically, because environmental interferences, manufacturing deviations, etc., different light sensing units in the display panel have different noise interference and produce different leakage currents. The third sub-sensing signal is read through the signal reading line 13 to obtain the second noise signal and a second leakage current signal. Wherein, through turning off the light sensing units, the signal of the display panel can be directly read for the first time to make the obtained third sub-sensing signal not include a second photocurrent to be detected.

1022, reading the signal of the display panel for a second time to obtain a fourth sub-sensing signal, wherein the fourth sub-sensing signal includes the second noise signal and a second photocurrent.

Specifically, after the display panel sensing light, reading the signal of the display panel for the second time to obtain the fourth sub-sensing signal. At this time, the display panel is irradiated by laser or other sources, and the light sensing units produce a photo current. Meanwhile, because factors such as environmental interferences, manufacturing deviations, etc., the fourth sub-sensing signal includes the second noise signal, the second leakage current signal, and the second photocurrent. Wherein, through turning on the light sensing units, the signal of the display panel can be read for the second time to make the obtained fourth sub-sensing signal include the second photocurrent to be detected.

1023, producing the second sensing signal according to the third sub-sensing signal and the fourth sub-sensing signal.

Specifically, from step 1011 and step 1012, through obtaining a difference between the first sub-sensing signal and the second sub-sensing signal, the obtained first sensing signal is the photocurrent produced after the display panel being irradiated by laser, eliminating the noise signal and the leakage current signal, thereby increasing a signal-to-noise ratio.

103, producing a target sensing signal according to the first sensing signal and the second sensing signal.

Wherein, a mean value of the first sensing signal and the second sensing signal can be calculated to obtain the target sensing signal. Thereby, crosstalk of sensing signals due to alternatively varying display voltage among each display cycle can be mitigated, increasing detection accuracy of the sensing signals.

Figure 4:
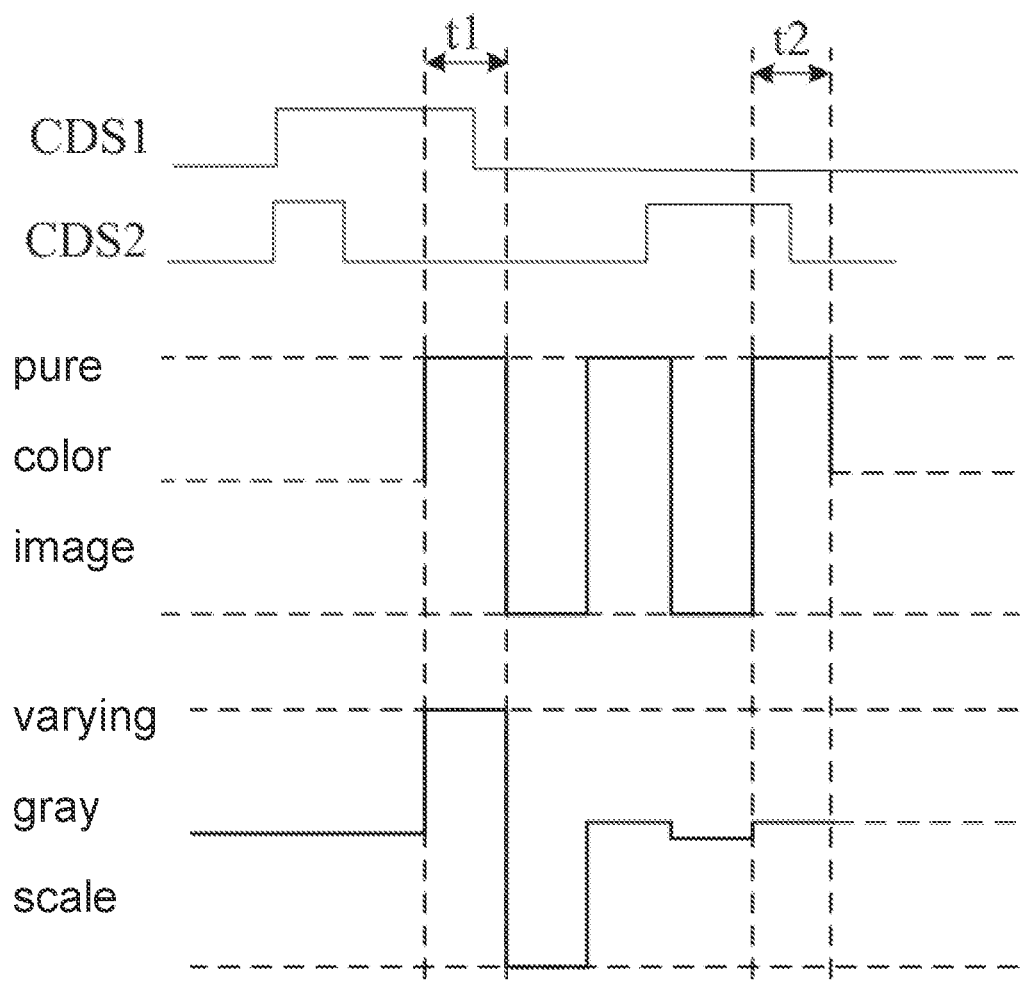
FIG. 4 is a first principle schematic diagram of the detection method of the sensing signal according to the present application.
Figure 5:
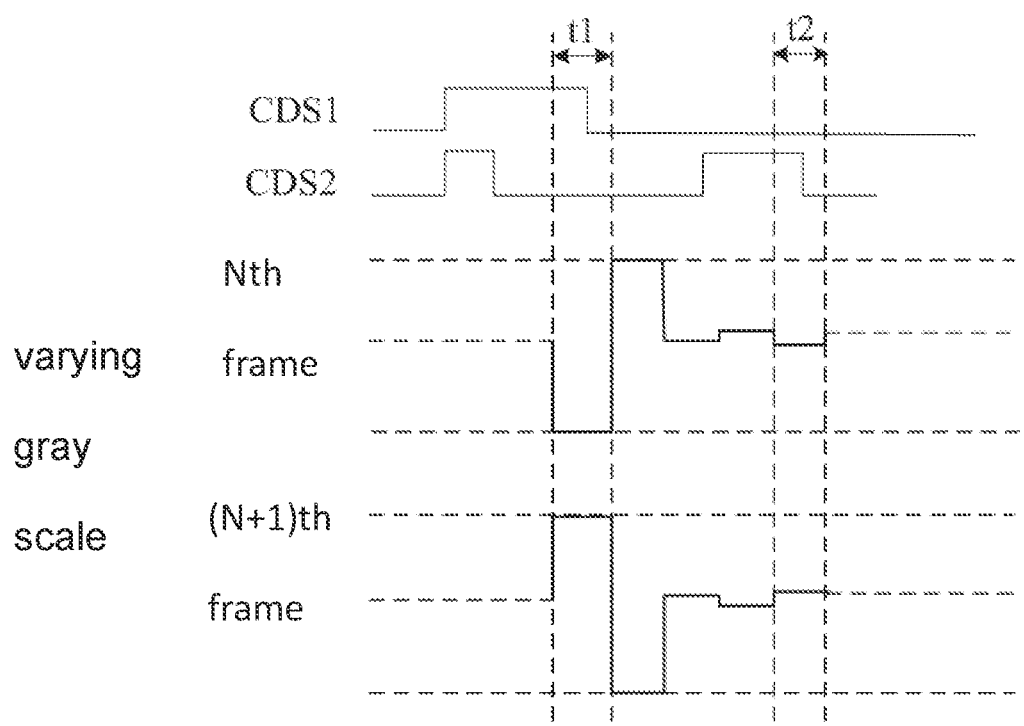
FIG. 5 is a second principle schematic diagram of the detection method of the sensing signal according to the present application.

Specifically, referring to FIG. 4 and FIG. 5, FIG. 4 is a first principle schematic diagram of the detection method of the sensing signal according to the present application, and FIG. 5 is a second principle schematic diagram of the detection method of the sensing signal according to the present application.

As shown in FIG. 4, in one display cycle, a signal of a display panel can be read for a first time and a second time under control of a first sensing signal CDS1 and a second sensing signal CDS2, respectively. Specifically, when the display panel displays a pure color image, display voltage values corresponding to one frame are same. Therefore, in a first signal reading phase t1 and a second signal reading phase t2, display voltages vary in a same way, and detection interference on the sensing signals mutually cancels. However, when displaying a non-pure color image, that is, when a gray scale varies among rows of a display image, in the first signal reading phase t1 and the second signal reading phase t2, display voltages vary differently, and therefore detection interference on the sensing signals cannot be canceled, leading to an inaccurate detection result of the sensing signals.

As shown in FIG. 5, in the present application, the first sensing signal and the second sensing signal are separately detected in two display cycles. For example, a first sensing signal is obtained in a display cycle of an Nth frame, and a second sensing signal is obtained in a display cycle of an (N+1)th frame. Because display voltage polarities corresponding to the display cycle of the Nth frame and the display cycle of the (N+1)th frame are opposite to each other, through obtaining a mean value of the first sensing signal and the second sensing signal, detection interference on the sensing signals due to varying display voltages can be canceled.

It should be explained that a frequency of signal reading is not limited in the present application. For example, in the present application, signal reading can be performed in each display cycle, but it can also be performed in specific display cycles according to practical requirements. However, opposite display voltage polarities of a display cycle corresponding to the first sensing signal and the second sensing signal must be satisfied.

Optionally, in the present application, signal reading is performed in each display cycle, and a target sensing signal is obtained through processing sensing signals read in each adjacent display cycles. That is, a display cycle of a first frame and a display cycle of a second frame are adjacent display cycles, for example, "frame a and frame b, frame b and frame c, frame b and frame c, etc." In this way, a report rate of signal reading is ensured, further increasing detection accuracy of the sensing signals.

In some embodiments of the present application, in each display cycle, the step of reading the signal of the display panel for the first time and the step of reading the signal of the display panel for the second time have a plurality of rows of pixel scan time therebetween.

It can be understood that, after reading the signal of the display panel for the first time, the obtained first sub-sensing signal has to be processed. Therefore, there has to be a certain period of time between reading the signal of the display panel for the first time and reading the signal of the display panel for the second time. Furthermore, in the display panel, each row of light sensing units can be disposed corresponding to a plurality of rows of sub-pixel units, and each row of the light sensing units share a scan signal with one of the rows of sub-pixels. In this way, when performing a row scan, corresponding light sensing units can be simultaneously turned on to detect sensing signals. Therefore, at least one row or a plurality of rows of pixel scan time is between reading the signal of the display panel for the first time and reading the signal of the display panel for the second time. Wherein, a time period between reading the signal of the display panel for the first time and reading the signal of the display panel for the second time can be decided according to transmittance of the display panel and a processing rate of the sensing signals.

Correspondingly, the present application further provides a sensing circuit that adopts the detection method of the sensing signal according to any one of the above-described embodiments to detect sensing signals. Referring to the above for specific contents, repeated description is omitted here.

Figure 6:
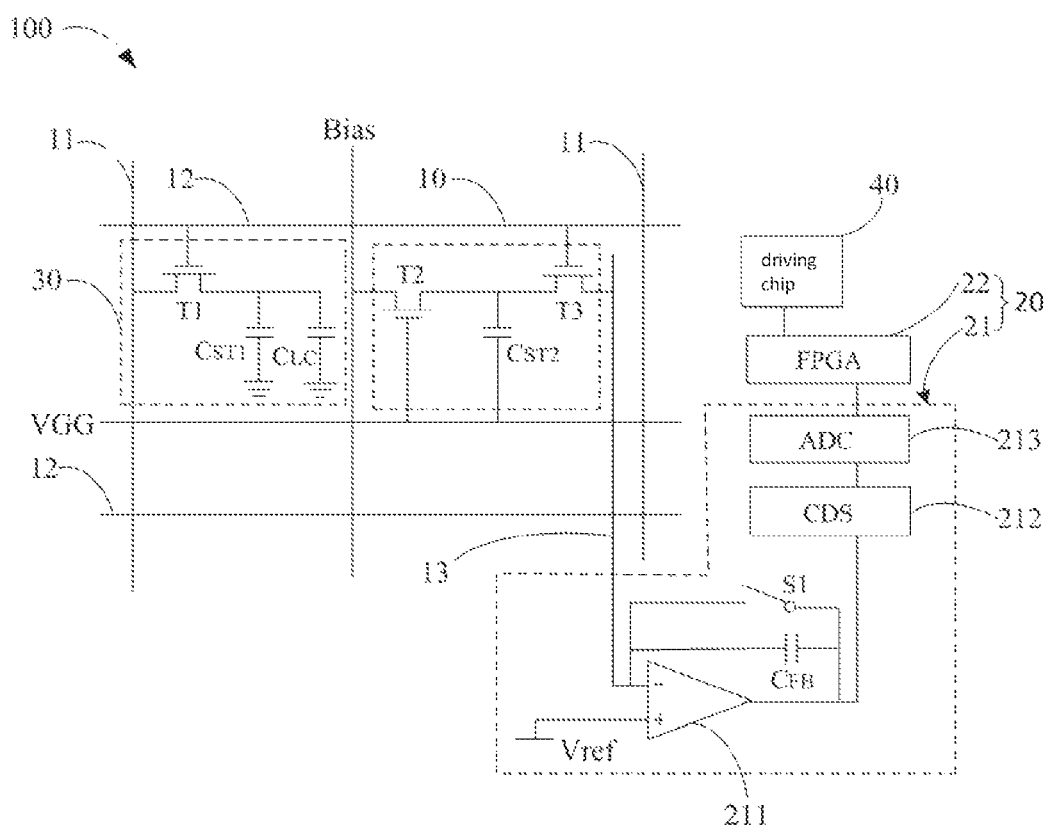
FIG. 6 is a structural schematic diagram of a sensing circuit according to the present application.

Referring to FIG. 6, FIG. 6 is a structural schematic diagram of a sensing circuit according to the present application. The sensing circuit 100 includes a data line 11, a scan line 12, a signal reading line 13, a light sensing module 10, and a detection module 20. The data line 11 and the scan line 12 are disposed intersecting each other. The data line 11 is disposed parallel to and adjacent to the signal reading line 13. The light sensing module 10 is electrically connected to the detection module 20 through the signal reading line 13. The detection module 20 detects the light sensing module 10 using the detection method of the sensing signal according to any one of the above-described embodiments to obtain a target sensing signal.

In the present application, the data line 11 and the scan line 12 intersects each other to locate a sub-pixel unit (not shown), and the sub-pixel unit is arranged in an array. Each sub-pixel unit includes a pixel driving circuit 30. The pixel driving circuit 30 is configured to drive the sub-pixel unit to emit light. Wherein, each light sensing module 10 can be disposed corresponding to a plurality of sub-pixel units. For example, a light sensing module 10 is disposed corresponding to every six rows and six columns of sub-pixel units. Obviously, the present application is not limited thereto. Wherein, the light sensing module 10 shares a same scan line 12 with any one row of six rows of the sub-pixel unit. That is, the light sensing module 10 shares a same scan signal with one row of the sub-pixel unit.

Specifically, the pixel driving circuit 30 includes a control transistor T1, a storage capacitor $C_{ST1}$, and a liquid crystal capacitor $C_{LC}$. Wherein, a gate of the control transistor T1 is electrically connected to a corresponding scan line 12 to receive a scan signal. A source of the control transistor T1 is electrically connected to a corresponding data line 11 to receive a data signal, that is, a display voltage. A drain of the control transistor T1 is connected to one terminal of the storage capacitor $C_{ST1}$ and one terminal of the liquid crystal capacitor $C_{LC}$. The other terminal of the storage capacitor $C_{ST1}$ and the other terminal of the liquid crystal capacitor $C_{LC}$ are grounded.

The pixel driving circuit 30 in embodiments of the present application is a 1T2C driving circuit, whose operation principle is well known for a person of ordinary skill in the art, and repeated description is omitted here. It should be explained that the pixel driving circuit 30 in the present application is merely for illustration and is not intended to limit the present application.

Specifically, the light sensing module 10 includes a light sensing transistor T2, a switch transistor T3, and a sensing capacitor $C_{ST2}$. Wherein, a gate of the light sensing transistor T2 is input by a first power voltage VGG. A source of the light sensing transistor T2 is input by a second power voltage Bias. A drain of the light sensing transistor T2, one terminal of the sensing capacitor $C_{ST2}$, and a source of the switch transistor T3 are connected. A gate of the switch transistor T3 is input by a scan signal, and a drain of the switch transistor T3 is electrically connected to the signal reading line 13.

The light sensing module 10 in embodiments of the present application is a driving circuit with a 2T1C structure. The light sensing module has light sensing functions such as sensing laser and produces a photocurrent. An operation sequence of the light sensing module 10 includes a light sensing phase and a signal reading phase. During an initialization phase, irradiated by an external light source, the gate of the light sensing transistor T2 is applied by the first power voltage VGG, the drain of the light sensing transistor T2 is applied by the second power voltage Bias, and the light sensing transistor T2 is turned off. Under irradiation, the light sensing transistor T2 produces photocarriers, and a corresponding photocurrent flows from the light sensing transistor T2 to the sensing capacitor $C_{ST2}$. The photocurrent flowing to the sensing capacitor $C_{ST2}$ is stored in the sensing capacitor $C_{ST2}$ and generates electrical energy. During the signal reading phase, the gate of the switch transistor T3 is input by the scan signal and turned on. Voltage of the sensing capacitor $C_{ST2}$ is released from the drain of the switch transistor T3. The signal reading line 13 reads the photocurrent flowing to the switch transistor T3. During the signal reading phase, the light sensing transistor T2 remains turning off.

Transistors adopted in the present application can be thin film transistors, field-effect transistors, or other devices with same characteristics. Because a source and a drain of transistors adopted here are symmetrical, the source and the drain are exchangeable. In embodiments of the present application, in order to distinguish two terminals of a transistor other than a gate, one terminal is represented as a source, and the other terminal is represented as a drain. As shown in figures, a middle terminal of a switch transistor is a gate, a signal input terminal is a source, and an output terminal is a drain. Furthermore, transistors adopted in embodiments of the present application can include p-channel transistors and/or n-channel transistors. Wherein, a p-channel transistor is conductive when its gate has a low voltage level and is cut off when the gate has a high voltage level. An n-channel transistor is conductive when its gate has a high voltage level and is cut off when the gate has a low voltage level.

Furthermore, in each display cycle, signal reading can be performed two times for the display panel through the sensing circuit 100. When reading a signal of the display panel for a first time, the light sensing transistor T2 and the switch transistor T3 are turned off. At this time, because environmental interferences and manufacturing deviations causing different leakage currents of transistors, a first sensing signal read through the signal reading line 13 includes a noise signal and a leakage current signal. When reading the signal of the display panel for a second time, the light sensing transistor T2 is turned off and the switch transistor T3 is turned on. At this time, a second sensing signal read through the signal reading line 13 includes a noise signal, a leakage current signal, and a photocurrent. Therefore, in each display cycle, through reading the signal of the display panel for two times, a photocurrent can be obtained, which means the noise signal and the leakage current signal are cancelled, thereby increasing a signal-to-noise ratio.

Furthermore, the switch transistor T3 in the light sensing module 10 and the control transistor T1 in the pixel driving circuit 30 share a same scan signal. Through this configuration, the pixel driving circuit 30 and the light sensing module 10 can be simultaneously turned on during a same row of scan time, such that when the display panel displays, reading of sensing signals can be simultaneously performed, thereby simplifying signal wiring in the display panel.

In the present application, the detection module 20 includes a sampling unit 21 and a processing unit 22. The sampling unit 21 is configured to obtain the first sensing signal and the second sensing signal through the signal reading line 13. The processing unit 22 is connected to the sampling unit 21 and configured to process the first sensing signal and the second sensing signal to produce the target sensing signal.

Wherein, the sampling unit 21 includes an amplifier 211, an integrator capacitor $C_{FB}$, a switch device S1, a correlated double sampling (CDS) circuit 212, and an analog-to-digital converter (ADC) 213. A first input terminal of the amplifier 211 is input by a reference voltage Vref. A second input terminal of the amplifier 211 is electrically connected to the signal reading line 13. An output terminal of the amplifier 211 is connected to the CDS circuit. The CDS circuit is connected to the ADC.

Wherein, when the sensing unit 20 reads the first sensing signal or the second sensing signal through the signal reading line 13, the amplifier 211 functions as an integrator, and through conduction of the switch device S1 it is initialized. When the switch device S1 is open, the amplifier 211 starts to perform an integration process on the first sensing signal or the second sensing signal. An integrated voltage will be stored into the CDS circuit 212 and sampled through the ADC 213.

In the present application, the amplifier 211 can be configured for an impedance matching of the first sensing signal or the second sensing signal of the signal reading line 13, thereby decreasing signal distortion of the signal reading line 13 transmitting to the CDS circuit, and increasing anti-interference capacity. Furthermore, the CDS circuit is configured to be a latch and perform logic operations for signals output from the output terminal of the amplifier 211 to produce a voltage signal. The ADC is configured for digital quantization of the voltage signal produced by the CDS circuit and to output, thereby obtaining the target sensing signal.

In the present application, the processing unit 22 can be a field-programmable gate array (FPGA). The FPGA processes the first sensing signal and the second sensing signal to obtain the target sensing signal. Furthermore, the sensing circuit further includes a driving chip 40, and the processing unit 22 outputs the processed target sensing signal to the driving chip 40. The driving chip 40 adjusts a driving voltage according to the received target sensing signal, thereby the display panel displaying corresponding images.

The present application provides a sensing circuit 100. The sensing circuit 100 includes a light sensing module 10, a signal reading line 13, and a detection module 20. The signal reading line 13 is connected to the light sensing module 10 and the detection module 20. The detection module 20 adopts the detection method of the sensing signal according to any one of the above-described embodiments to produce a target sensing signal through the signal reading line 13, thereby decreasing coupling effect of display voltage of a data line 11 on the signal reading line 13, increasing output stability of a photocurrent, and increasing detection accuracy and a signal-to-noise ratio of sensing signals.

Although the present application has been explained in relation to its preferred embodiment, it does not intend to limit the present application. It will be apparent to those skilled in the art having regard to this present application that other modifications of the exemplary embodiments beyond these embodiments specifically described here may be made without departing from the spirit of the application. Accordingly, such modifications are considered within the scope of the application as limited solely by the appended claims.

What is claimed is:

1. A detection method of a sensing signal, comprising following steps:

in a display cycle of a first frame, reading a signal of a display panel to obtain a first sensing signal, wherein the step of in a display cycle of a first frame, reading the signal of the display panel to obtain the first sensing signal comprises following steps: reading the signal of the display panel for a first time to obtain a first sub-sensing signal, wherein the first sub-sensing signal comprises a first noise signal without photocurrent;

reading the signal of the display panel for a second time to obtain a second sub-sensing signal, wherein the second sub-sensing signal comprises the first noise signal and a first photocurrent; and producing the first sensing signal indicative of the first photocurrent according to the first sub-sensing signal and the second sub-sensing signal;

in a display cycle of a second frame adjacent to the display cycle of the first frame, reading the signal of the display panel to obtain a second sensing signal, wherein the step of in the display cycle of the second frame, reading the signal of the display panel to obtain the second sensing signal comprises following steps:

reading the signal of the display panel for a first time to obtain a third sub-sensing signal, wherein the third sub-sensing signal comprises a second noise signal without photocurrent;

reading the signal of the display panel for a second time to obtain a fourth sub-sensing signal, wherein the fourth sub-sensing signal comprises the second noise signal and a second photocurrent; and producing the second sensing signal indicative of the second photocurrent according to the third sub-sensing signal and the fourth sub-sensing signal;

wherein a polarity of a display voltage corresponding to the display cycle of the second frame and a polarity of a display voltage corresponding to the display cycle of the first frame are opposite to each other; and producing a target sensing signal according to the mean value of the first sensing signal and the second sensing signal;

wherein the step of reading the signal of the display panel for the first time and the step of reading the signal of the display panel for the second time have at least one row of pixel scan time therebetween.

2. The detection method of the sensing signal as claimed in claim 1, wherein the step of producing the first sensing signal according to the first sub-sensing signal and the second sub-sensing signal comprises following steps:

obtaining a difference between the first sub-sensing signal and the second sub-sensing signal to obtain the first sensing signal.

3. The detection method of the sensing signal as claimed in claim 1, wherein the step of producing the second sensing signal according to the third sub-sensing signal and the fourth sub-sensing signal comprises following steps:

obtaining a difference between the third sub-sensing signal and the fourth sub-sensing signal to obtain the second sensing signal.

4. A sensing circuit, comprising a light sensing module and a detection module;

wherein the light sensing module is connected to the detection module, and through the light sensing module, the detection module is configured to, in a display cycle of a first frame, read a signal of a display panel to obtain a first sensing signal, wherein the sensing circuit is configured to, in the display cycle of the first frame, read the signal of the display panel for a first time to obtain a first sub-sensing signal, wherein the first sub-sensing signal comprises a first noise signal without photocurrent;

read the signal of the display panel for a second time to obtain a second sub-sensing signal, wherein the second sub-sensing signal comprises the first noise signal and a first photocurrent; and produce the first sensing signal indicative of the first photocurrent according to the first sub-sensing signal and the second sub-sensing signal;

in a display cycle of a second frame adjacent to the display cycle of the first frame, read the signal of the display panel to obtain a second sensing signal, wherein the sensing circuit is configured to in the display cycle of the second frame, read the signal of the display panel for a first time to obtain a third sub-sensing signal, wherein the third sub-sensing signal comprises a second noise signal without photocurrent;

read the signal of the display panel for a second time to obtain a fourth sub-sensing signal, wherein the fourth sub-sensing signal comprises the second noise signal and a second photocurrent; and produce the second sensing signal indicative of the second photocurrent according to the third sub-sensing signal and the fourth sub-sensing signal; wherein a polarity of a display voltage corresponding to the display cycle of the second frame and a polarity of a display voltage corresponding to the display cycle of the first frame are opposite to each other; and produce a target sensing signal according to the mean value of the first sensing signal and the second sensing signal;

wherein reading the signal of the display panel for the first time and reading the signal of the display panel for the second time have at least one row of pixel scan time therebetween.

5. The sensing circuit as claimed in claim 4, wherein the light sensing module comprises a light sensing transistor, a switch transistor, and a sensing capacitor;

wherein a gate of the light sensing transistor is input by a first power voltage, a source of the light sensing transistor is input by a second power voltage, a drain of the light sensing transistor, one terminal of the sensing capacitor, and a source of the switch transistor are connected, a gate of the switch transistor is input by a scan signal, and a drain of the switch transistor is connected to the detection module; and wherein when reading the signal of the display panel for a first time, the light sensing transistor and the switch transistor are turned off, and when reading the signal of the display panel for a second time, the light sensing transistor is turned off and the switch transistor is turned on.

6. The sensing circuit as claimed in claim 4, wherein the detection module comprises a sampling unit and a processing unit;

wherein the sampling unit is connected to the light sensing module and configured to obtain the first sensing signal and the second sensing signal; wherein the processing unit is connected to the sampling unit and configured to process the first sensing signal and the second sensing signal to produce the target sensing signal.

7. The sensing circuit as claimed in claim 6, wherein the processing unit is a field-programmable gate array (FPGA).

8. The sensing circuit as claimed in claim 6, wherein the sampling unit comprises an amplifier, an integrator capacitor, a switch device, a correlated double sampling (CDS) circuit, and an analog-to-digital converter (ADC);

wherein a first input terminal of the amplifier is input by a reference voltage, a second input terminal of the amplifier is electrically connected to the signal reading line, an output terminal of the amplifier is connected to the CDS circuit, and the CDS circuit is connected to the ADC.

9. The sensing circuit as claimed in claim 6, comprising a driving chip, wherein the processing unit outputs the target sensing signal to the driving chip.

* * * * *